UNITED STATES PATENT OFFICE.

HARRY P. BASSETT, OF CYNTHIANA, KENTUCKY.

PROCESS OF PRODUCING ALUMINA AND POTASH.

1,410,642. Specification of Letters Patent. Patented Mar. 28, 1922.

No Drawing. Original application filed February 16, 1920, Serial No. 358,988. Divided and this application filed April 14, 1921. Serial No. 461,433.

*To all whom it may concern:*

Be it known that I, HARRY P. BASSETT, a citizen of the United States, residing at Cynthiana, in the county of Harrison and State of Kentucky, have invented certain new and useful Improvements in Processes of Producing Alumina and Potash, of which the following is a specification.

This invention relates to the production of alumina and potash, and more particularly to a method of obtaining alumina and potassium from silicates, such as feldspar containing potassium and aluminum; and comprises a method wherein finely ground feldspar is mixed with substantially twice its weight of sodium carbonate and an amount of common salt or sodium sulfate equivalent to the potassium content, heated preferably to a red heat in a rotary furnace for preferably about one hour, the potassium sulfate and sodium silicate produced, (and excess sodium carbonate) being extracted with water, leaving the insoluble silicate ($NaAlSi_2O_6$) undissolved, the silicate being treated with caustic soda, lime, and an oxide of iron to obtain sodium aluminate, this aluminate being boiled or agitated to obtain a precipitate of aluminum hydroxid, all as more fully hereinafter described and claimed.

In the present process, a silicate containing potassium and aluminum is treated with an oxide of sodium and a sodium salt to produce an insoluble silicate of sodium and aluminum, a potassium salt and sodium silicate. The potassium salt and sodium silicate, which are soluble, are separated from the insoluble silicate by extraction and the sodium silicate is removed from the solution thus formed by precipitation with calcium. From the potassium salt thus obtained, the potash may be easily recovered. The insoluble silicate of sodium and aluminum is then treated with caustic soda with a small amount of an oxide of calcium, with an iron oxide present, the lime being used to release the soda and the iron to replace the aluminum in the silicate. The aluminum and sodium hydroxids thus freed combine to form sodium aluminate from which the alumina is readily recovered by heating and agitating.

This application is a division of my co-pending application Serial No. 358,988, filed February 16, 1920. In the copending application, I have disclosed the broad method of obtaining potassium and aluminum from potassium and aluminum containing materials, and have also disclosed and claimed an alternative form, wherein the calcium and iron oxide are added to the original mixture containing the silicate, sodium salt, and oxide of sodium.

As in the process described in my copending application, the process is applicable for treating any silicate containing aluminum and potassium, such as feldspar, bauxite containing silicates or aluminum and potassium as impurities, leucite, and other potassium containing rocks, sands, or clays, and the process is particularly applicable to the treatment of bauxite and other silicates having a high content of iron or iron oxide.

As an illustrative example of the process, the following detailed description is set forth: A quantity of feldspar or other silicate of potassium and aluminum, is ground to a suitable fineness, preferably about 100 mesh, and mixed with twice its weight of a basic compound of sodium, such as $Na_2CO_3$, and an amount of a sodium salt, such as sodium chloride or sodium sulfate, equivalent to the potassium content of the silicate. This mixture is heated preferably in the rotary kiln, to a red heat for about one hour. During the heating, the following reaction takes place:

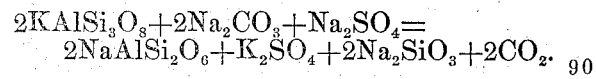

$2KAlSi_3O_8 + 2Na_2CO_3 + Na_2SO_4 =$
$2NaAlSi_2O_6 + K_2SO_4 + 2Na_2SiO_3 + 2CO_2$.

If sodium chlorid is used in place of sodium sulfate, potassium chlorid is obtained in place of the potassium sulfate. The sodium silicate, potassium salt and excess sodium carbonate are extracted from this mixture with water leaving the insoluble silicate ($NaAlSi_2O_6$) undissolved. The sodium silicate is readily removed by treatment with a small amount of lime and potassium salt may be obtained from the solution by evaporation. The potassium sulfate or potassium chlorid may be readily recovered by any of the well known treatments.

The insoluble silicate of sodium and aluminum may be decomposed by treatment with a solution of caustic soda with a small amount of a compound of calcium, as calcium oxide and iron oxide present, the lime being used to release the sodium and the iron to replace the aluminum in the silicate. The sodium and aluminum combine to form aluminate or aluminum oxide. In this latter treatment, the following reactions take place:

$$2NaAlSi_2O_6 + Ca(OH)_2 = Ca(AlSi_2O_6)_2 + 2NaOH$$
$$Ca(AlSi_2O_6)_2 + Fe_2O_3 + 2NaOH = Ca(FeSi_2O_6)_2 + Na_2Al_2O_4 + H_2O.$$

The insoluble silicate of calcium and iron is separated from the sodium aluminate by filtration, and the solution containing the sodium aluminate is boiled or agitated according to the Baeyer process which precipitates aluminum as aluminum hydroxid. This is filtered off, dried, and washed to remove any excess of caustic soda and redried to a white powder which is found to be better than 99 per cent pure.

Under some conditions, it is advantageous to employ the calcium oxide and the iron oxide in the mass of silicate, sodium oxide and sodium salt during the heating step rather than during the treatment of the insoluble silicate and sodium hydroxide. When the process is performed in this way, an insoluble silicate of calcium and iron is obtained, the sodium silicate formed in the first step reacts with the calcium present to form calcium silicate and sodium hydroxid and aluminum hydroxid $Al_2(OH)_6$ is formed. The aluminum hydroxid and sodium hydroxid unite to form sodium aluminate and water according to the following reaction:

$$Al_2(OH)_6 + 2NaOH = Na_2Al_2O_4 + 4H_2O.$$

The presence of iron in this reaction prevents the caustic soda from acting upon the insoluble silicate of sodium and aluminum formed in the preliminary step of the reaction and only the aluminum hydroxid is acted on by it.

When the process is performed in this manner, the potassium salt and excess sodium carbonate are dissolved from the mixture leaving the sodium aluminate and insoluble silicate $Ca(FeSiO_6)_2$, undissolved. The potassium salt is separated from the solution containing it and sodium carbonate by concentration, and the mother liquor containing the sodium carbonate may be used in the furnace reaction to treat more silicate.

The insoluble residue is treated with caustic soda in a solution of the specific gravity of 1.1 which unites with the aluminum hydroxid to form sodium aluminate and leaves the insoluble silicate free. The sodium aluminate solution is then separated from the insoluble silicate by filtration and may be precipitated as aluminum hydroxid by boiling or agitating, as in the Baeyer reaction. The mother liquor may be returned for further use in treating the insoluble silicate of sodium and aluminum. The aluminum hydroxid is then dried, washed, and redried and a product of 99 per cent pure or better is obtained.

In a further modification, the silicate is treated with one and a half times its weight of caustic soda in the presence of a sodium salt equivalent to the potash content of the silicate. The mass is dried and heated in an iron retort to a temperature of 450° C. for one hour. According to a method described by J. C. W. Frazer, in the "Transactions of the American Institute of Chemical Engineers," and read at Buffalo meeting, June, 1917, the following reaction is supposed to take place:

$$2KAlSi_3O_8 + 4NaOH = 2NaAlSi_2O_6 + K_2SiO_3 + Na_2SiO_3.$$

The potassium silicate and sodium salt unite to form additional sodium silicate, potassium salt, and water according to the following reaction:

$$K_2SiO_3 + Na_2SO_4 = Na_2SiO_3 + K_2SO_4 + 2H_2O.$$

From repeated experiments, I have found the reactions made by Frazer are correct, but they do not represent the whole reaction, as the insoluble silicate of sodium and aluminum is acted upon to form additional sodium silicate and a large amount of sodium aluminate. If the Frazer reaction were the complete reaction that takes place under these conditions, there would be no sodium aluminate or aluminum hydroxid present in the solution when the products of the reaction were leached with water, the silicate of sodium and aluminum ($NaAlSi_2O_6$) being insoluble. On repeated trials with varying proportions of material, I have found that aluminum hydroxid or sodium aluminate were invariably present. It is thus apparent that the sodium aluminum silicate is partially reacted upon to form additional sodium silicate and sodium aluminate.

In order to eliminate the possibility of forming calcium compounds containing alumina, such as the silicate of calcium and aluminum, I find it advisable to add iron oxide and calcium oxide to the fusion mixture when the process is performed in this manner. I accordingly use a mixture of potassium and aluminum silicate, (such as feldspar or bauxite) sodium hydroxid, iron oxide, oxide of calcium, and a sodium salt, producing a silicate of sodium and iron, sodium aluminate, a potassium salt, and water. The silicate of soda and iron preliminarily formed reacts with calcium hydroxid to form a silicate of calcium and iron and sodium hydroxid. As a result of this reaction, the sodium aluminate formed is not completely soluble, but, by treating the mass as it comes from the fusion treatment with water, under pressure, the total aluminum content is made soluble. The insoluble silicate of calcium and iron is removed by filtration and the solution evaporated to produce a potassium salt and aluminum hydroxid. This precipitate is now dried, and the potassium sulfate is extracted by leaching. The aluminum hydroxid is redried, producing a 99 per cent pure product.

This modification of the process is advantageous in the treatment of clays, and especially bauxite, containing a high percentage of silicate and iron. The addition of lime in the various examples of the process set forth is not essential, as the process could be carried out with this step eliminated. However, in place of the insoluble silicate of calcium and iron which is left as a residue, the silicate obtained, if the calcium is not added, is a silicate of sodium and iron. In other words, if the treatment with calcium hydroxid is eliminated, all the soda is not recovered and I find it advantageous to recover the soda in the form of sodium hydroxid, and use the sodium hydroxid thus obtained in the second step of the process.

While I have described in detail the preferred practice of my process, it is to be understood that my invention is not limited to the proportions of reagents and details of procedure, but that these may be varied without departing from the spirit of my invention or the scope of the subjoined claims.

Having thus described my invention, I claim:

1. The method of obtaining compounds of aluminum and potassium from materials containing aluminum and silicon which comprises mixing said materials with a carbonate of an alkali metal and a sodium salt of a mineral acid, heating and extracting to obtain an insoluble silicate of sodium and aluminum, treating said silicate with caustic soda, oxide of iron, and oxide of calcium to form sodium aluminate, and treating said aluminate to obtain aluminum hydroxid.

2. The process of obtaining aluminum hydroxid from materials containing aluminum and silicon which comprises mixing said materials with sodium carbonate and a sodium salt of a mineral acid, heating and extracting to obtain an insoluble silicate of sodium and aluminum, treating said silicate with caustic soda, oxide of calcium, and an oxide of iron, to form sodium aluminate, and treating said aluminate to obtain aluminum hydroxid therefrom.

3. The process of obtaining aluminum hydroxid from materials containing aluminum and silicon which comprises mixing said materials with sodium carbonate and sodium sulfate, heating and extracting to obtain an insoluble silicate of sodium and aluminum, treating said silicate with caustic soda, an oxide of iron, and oxide of calcium to form sodium aluminate, and treating said aluminate to obtain aluminum hydroxid therefrom.

In testimony whereof I affix my signature.

HARRY P. BASSETT.